UNITED STATES PATENT OFFICE.

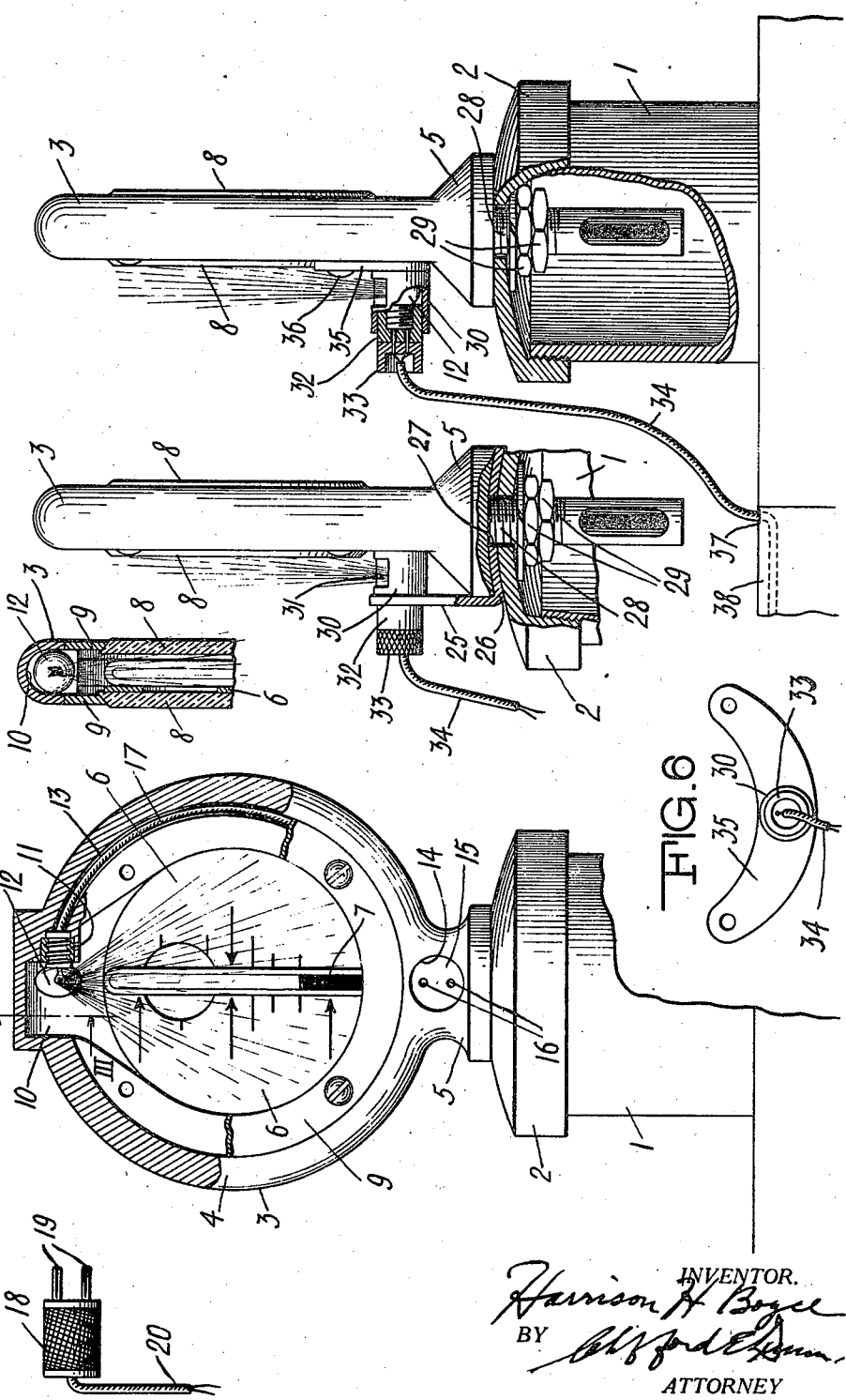

HARRISON H. BOYCE, OF FOREST HILLS, NEW YORK.

MEANS FOR ILLUMINATING INDICATING INSTRUMENTS.

1,311,153.  Specification of Letters Patent.  Patented July 29, 1919.

Application filed March 29, 1916. Serial No. 87,421.

*To all whom it may concern:*

Be it known that I, HARRISON H. BOYCE, a citizen of the United States, residing at Forest Hills, in the county of Queens, city and State of New York, have invented certain new and useful Improvements in Means for Illuminating Indicating Instruments, of which the following is a specification.

In my Patent No. 1,090,776 is disclosed an instrument adapted to be mounted upon the radiator filler cap of an automobile for indicating the thermal condition of the engine. Under some conditions it is desirable to provide special means for illuminating such instruments, or other similarly mounted devices, in order to facilitate their observation after dark, and my present invention relates to means for accomplishing this purpose.

In the accompanying drawings which form a part of this specification and which show certain preferred embodiments of my invention, Figure 1 is a front elevation partly in section of an instrument mounted on the radiator filler cap of an automobile, parts being broken away to show the interior construction. Fig. 2 is a view of the plug for connecting the electrical conductors with the instrument. Fig. 3 is a sectional view on line III—III of Fig. 1. Fig. 4 is a side elevation of a modified form of my invention. Fig. 5 is a side elevation of another modification of the invention. Fig. 6 is a front elevation of the attachment shown in Fig. 5.

Referring to the drawings in detail and particularly to Figs. 1, 2 and 3, 1 designates the radiator filler spout, 2 is the removable filler cap and 3 is the indicating instrument which, in this instance, comprises the annular frame member 4, having the base 5 adapted to be attached to the radiator cap and carrying the dial plate 6 and the thermometer tube 7. The dial plate and thermometer are inclosed between the crystals 8, which are retained in position by the retaining rings 9. The construction for illuminating the dial and thermometer tube is as follows: A recess 10 is formed in the frame, preferably at the top of the instrument, a lamp socket 11 being mounted in one side of the recess. A small electric lamp 12 is held in this socket, the light rays from this lamp falling on the thermometer tube and dial as indicated in Fig. 3. A channel 13 is formed in the annular portion of the frame extending from the lamp socket to a recess 14 formed in the base of the instrument in which recess is secured a connector socket 15. The latter is provided with a pair of terminals 16 which are connected to the terminals of the lamp socket by a cable 17 located in the channel. Fig. 2 shows a plug 18 provided with two terminals 19 adapted to enter the terminal 16 in the plug 15 and establish electrical connection therewith. The plug 18 is attached to the end of a flexible cable 20 which is connected at its other end (not shown) with the lighting system of the car, it being led off in any suitable manner, preferably through a hole in the hood of the car adjacent to the radiator as shown, for example, in Fig. 5. With this construction it will be seen that a simple and compact means is provided for illuminating the instrument. Connection can be quickly established or broken between the plug 18 and the socket 15, the disconnection of these parts permitting the removal of the filler cap so as to permit the filling of the radiator.

In Fig. 4 a modification of my invention is illustrated, in which simple means are provided for supporting an electric lamp in position to illuminate an instrument of the class described, this modification being distinguished by the fact that no change in the construction of the instrument from that now commonly in use is required. In accordance with this construction a bracket 25 having a base 26 with an aperture 27 therein is interposed between the base 5 of the instrument and the filler cap 2. The usual screw-threaded stem 28 of the instrument passes through the aperture 27 in a bracket and through a hole in the top of the filler cap, the instrument, bracket and filler cap being firmly clamped together by the lock nuts 29. The bracket 25 at its upper end carries a casing 30 having a window 31 in its top and containing a small electric lamp, a socket member 32 connected to the lamp casing and a plug 33 carried on the end of a flexible cable 34 providing convenient means for establishing an electric circuit through the lamp. The removal of the plug 33 permits the ready removal of the filler cap when necessary to fill the radiator. In this construction it will be seen that no modification of the indicating instrument or of the radiator cap is required, but the illuminating attachment is supported by merely clamping the bracket 25 between the instrument and the radiator cap by the use of the means employed for clamping the instrument to the cap.

Figs. 5 and 6 show another modification of the invention in which the lamp casing 30 is attached to a curved plate 35 which is secured to the front of the instrument 3 by the screws 36 or in any other suitable manner. The casing 30 carries the socket 32, which is adapted to receive the plug 33 mounted at the end of the cable 34. The latter is led to a connection with the lighting system of the car, it preferably passing down through a hole 37 in the hood 38 adjacent to the radiator.

While I have shown and described in detail certain preferred embodiments of my invention it will be understood that these are merely illustrative of the principle thereof, and I do not, therefore, desire to be limited to such embodiments, but intend to cover my invention broadly. It will be understood that various changes and modifications may be made without departing from the spirit of my invention. It will also be understood that my invention is applicable to the illumination of other devices than instruments of the type set forth.

Having thus described my invention, I claim:—

1. The combination with the radiator cap of an automobile, of an indicating instrument mounted thereon and projecting upwardly therefrom, an electric lamp mounted at the lower part of the instrument in front thereof and having one member of a separable connector associated therewith, a flexible electrical conductor adapted to be carried up outside of the filler spout and radiator cap, the other member of said separable connector being attached to the free end of said flexible conductor.

2. The combination with the radiator cap of an automobile, of an indicating instrument mounted thereon and projecting upwardly therefrom, an electric lamp mounted at the lower part of the instrument in front thereof and having one member of a separable connector associated therewith, a flexible electrical conductor adapted to be carried up outside of the filler spout and radiator cap, the other member of said separable connector being attached to the free end of said flexible conductor, said connector portion and said free end being wholly supported by the engagement of the former with the connector portion associated with the lamp.

3. The combination of an automobile radiator cap, an indicating instrument secured thereto, a bracket clamped between said instrument and said cap, and an electric lamp carried by said bracket.

4. The combination with the radiator cap of an automobile, of a device mounted thereon and having a portion projecting through a hole in said radiator cap, a bracket clamped between said device and said cap, and an electric lamp carried by said bracket.

5. The combination of an automobile radiator cap having a hole therethrough, a device mounted on said cap and having a stem projecting through said hole, means engaging said stem beneath said cap for securing the device to the cap, a bracket having a perforated portion clamped between said device and said cap, the stem of said device passing through the perforation in said portion, said bracket also having an upwardly projecting portion carrying an electric lamp.

6. The combination of an automobile radiator cap having an opening therethrough, a temperature indicating instrument having a base adapted to seat on said cap and having a screw-threaded stem projecting through said opening, a bracket having a perforated portion clamped between said base and the upper surface of said cap, the stem of said instrument projecting through an opening in said bracket portion, said bracket also having a portion extending upwardly, a casing carried by said upwardly extending bracket portion and an electric lamp in said casing adapted to illuminate the dial and indicating elements of said instrument.

HARRISON H. BOYCE.